United States Patent [19]

Hermanson et al.

[11] Patent Number: 5,055,753
[45] Date of Patent: Oct. 8, 1991

[54] PROGRAMMABLE SERVOMOTOR COIL WINDER

[75] Inventors: Donald R. Hermanson, New Hope; Steven A. Prokosch, North St. Paul; Daniel M. Jenson, Robbinsdale, all of Minn.

[73] Assignee: Honeywell Inc., Minneapolis, Minn.

[21] Appl. No.: 506,727

[22] Filed: Apr. 9, 1990

[51] Int. Cl.[5] .............................................. G05B 13/00
[52] U.S. Cl. .................................... 318/571; 318/638; 318/593; 364/474.01
[58] Field of Search ............................... 318/560–646, 318/696, 685, 43–98; 360/77.03, 77.05, 77.06, 77.08, 77.09; 242/7.09, 7.11, 7.15, 4 R, 4 A, 132; 364/474.01

[56] References Cited

U.S. PATENT DOCUMENTS

| | | | |
|---|---|---|---|
| 3,719,879 | 3/1973 | Marcy | 318/593 |
| 3,995,206 | 11/1976 | Aronstein et al. | 318/594 X |
| 4,617,498 | 10/1986 | Ruppert | 318/638 X |
| 4,817,007 | 3/1989 | New | 318/696 X |

Primary Examiner—Paul Ip
Attorney, Agent, or Firm—Whitham & Marhoefer

[57] ABSTRACT

A computer winding control and operator display for winding complex coils is programmed to control stepper motors connected to an arbor and a coil filament laying head. The computer program generates a series of commands to move the arbor and the head. The commands specify acceleration, velocity, extent of movement, and deceleration. The program at certain program steps stops the motion and generates operator display messages.

3 Claims, 5 Drawing Sheets

PROGRAMMABLE SERVOMOTOR COIL WINDER

BACKGROUND OF THE INVENTION

1. Field of the Invention

The Government has rights in this invention pursuant to Contract No. N00030-85-C-0038, awarded by the Department of the Navy.

This invention relates to a semiautomated, high speed method and apparatus for winding complex coils, and more particularly to a computer controlled process and operator interface for winding stator coils.

2. Description of the Prior Art

Complex servomotor stator coils are often wound by hand owing to the unavailability of a cost effective method and apparatus to automate the procedure for limited production runs of a particular winding pattern. By hand, a single winding may take up to seventeen hours to complete and have a rejection rate as high as seventy percent for completed windings.

SUMMARY OF THE INVENTION

It is therefore an object of the present invention to provide a semiautomated computerized method and apparatus which will greatly reduce the time needed to wind a coil and also reduce the rate of rejected coils.

Another object of the invention is the provision of a computerized system which is practical for and adaptable to small production runs, including winding of a single coil.

Briefly, this invention contemplates the provision of a computer program controlled coil winding/layering/positioning apparatus in which a pair of micro-positioning stepper motors are capable of programmed moves of less than one-thousandth of an inch. Each move can use default acceleration and velocity values, or if desired, each move's acceleration and velocity can be individually tailored. The initial program and any desired program changes can be made by a user from a keyboard and a video display.

The stepper motor pair respectively control the angular position of an arbor and traverse position of a head which moves above and along the axis of the arbor to position the winding filaments. An adjustable tensioning device is positioned over the head to control the layering pressure.

The system has two modes of operation. An operator works interactively with the keyboard and video display to produce a preprogrammed winding. The display prompts the operator with status displays and directions. The operator can control the positioning of the winding filament by stopping operation, changing operating speeds, and operating in a step by step mode while the operation calls for moving difficult positioning segments. A coil winding program developer can interactively program and can use either default or developer specified acceleration-velocity-deceleration envelopes. Repetitive move patterns are defined by DO loops, and pattern sequences can be referenced from subroutines.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
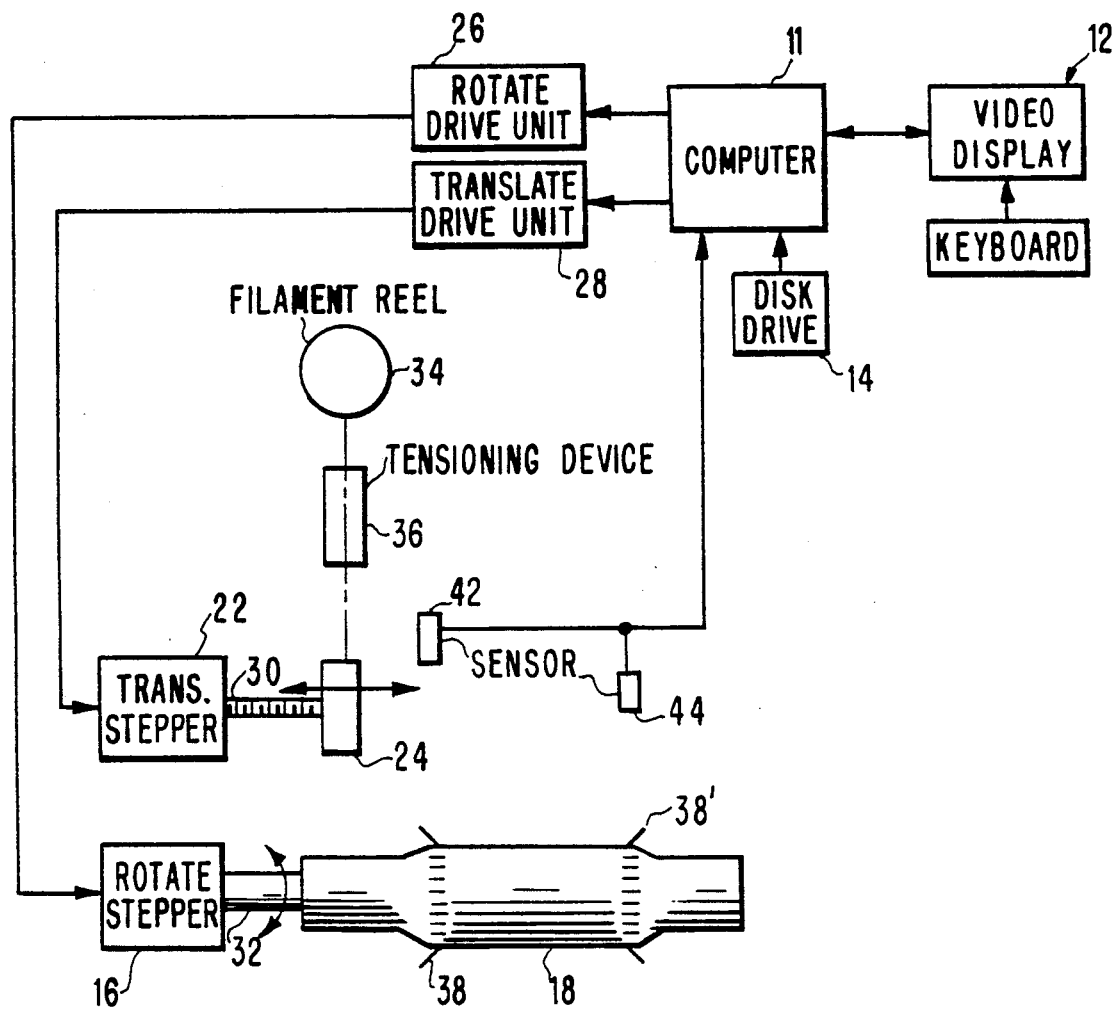
FIG. 1 is a partially schematic, partially block diagram drawing of one embodiment of a system in accordance with the teachings of this invention.

Referring now to the drawings, and more particularly to FIG. 1, a computer 11 has an interactive video display and keyboard indicated by the general reference numeral 12 and a removable disk drive 14. The computer 11 may comprise a CPU, a ROM/RAM memory, a disk drive controller, and stepper motor indexers. As will be appreciated by those skilled in the art, the system may be built from standard and readily accessible commercially available products.

The computer 11 controls the operation of a pair of stepper motors; stepper motor 16 rotates an arbor 18 and stepper motor 22 translates a head 24 which pays out the coil filament. The computer is coupled to the stepper motors 16 and 22 via a respective pair of stepper motor drive units 26 and 28. A lead screw 30 couples the stepper motor 22 to the head 24 and the arbor 18 is removably attached to a shaft 32 coupled to the stepper motor 16. A coil filament wire reel 34 and a tensioning device 36 feed the filament wire to the head 24. The arbor 18 has two sets of pins 38 and 38' around which the coil is wound. The pins are at angle to the arbor axis so that the filaments will pack down as the coil is wound. It will be appreciated that adjacent pins on either end of the arbor are tightly spaced from one another and that the head 24 is narrow enough to pass between theses pins. A pair of Hall effect sensors 42 and 44 respectively provide signals to the computer to establish the initial home position for the head 24 and the arbor 18 at the beginning of each coil winding operation.

Figure 2:
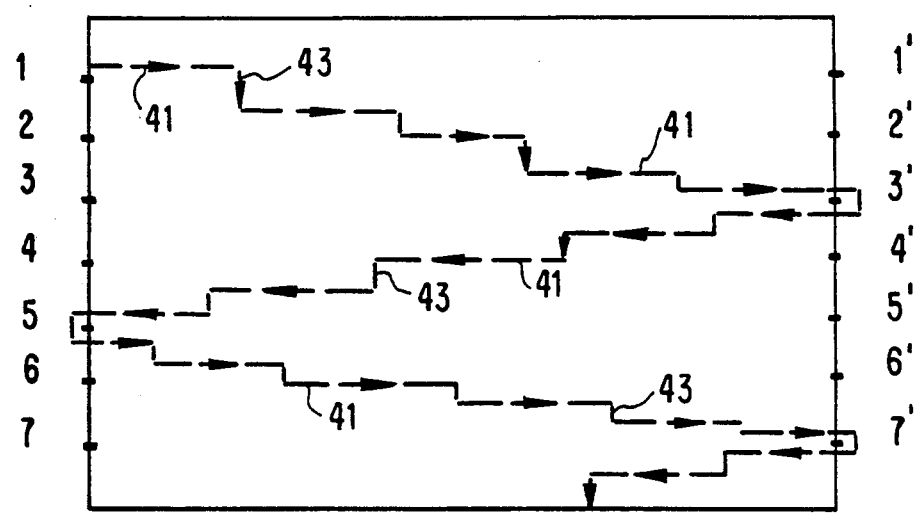
FIG. 2 is an illustration of the step by step relative movement of the head and arbor under program control as a filament is laid in a prescribed pattern.

Referring now to FIG. 2, a coil is built by winding a filament carried by the head 24 around the pins 38 and 3.81 in a pattern dictated by the coil designer and executed by the program steps, which may be stored in a disk. The motion of the head and the arbor are coordinated by the computer program to lay the filaments in the desired pattern. The head and arbor move in discrete coordinated steps, as illustrated in FIG. 2 by the horizontal lines 41 and the vertical lines 43. The head and arbor do not move simultaneously without operator intervention. The program may respond to an operator input command to perform simultaneously the next two program steps, in which case the arbor and head may move simultaneously.

Figure 3A:
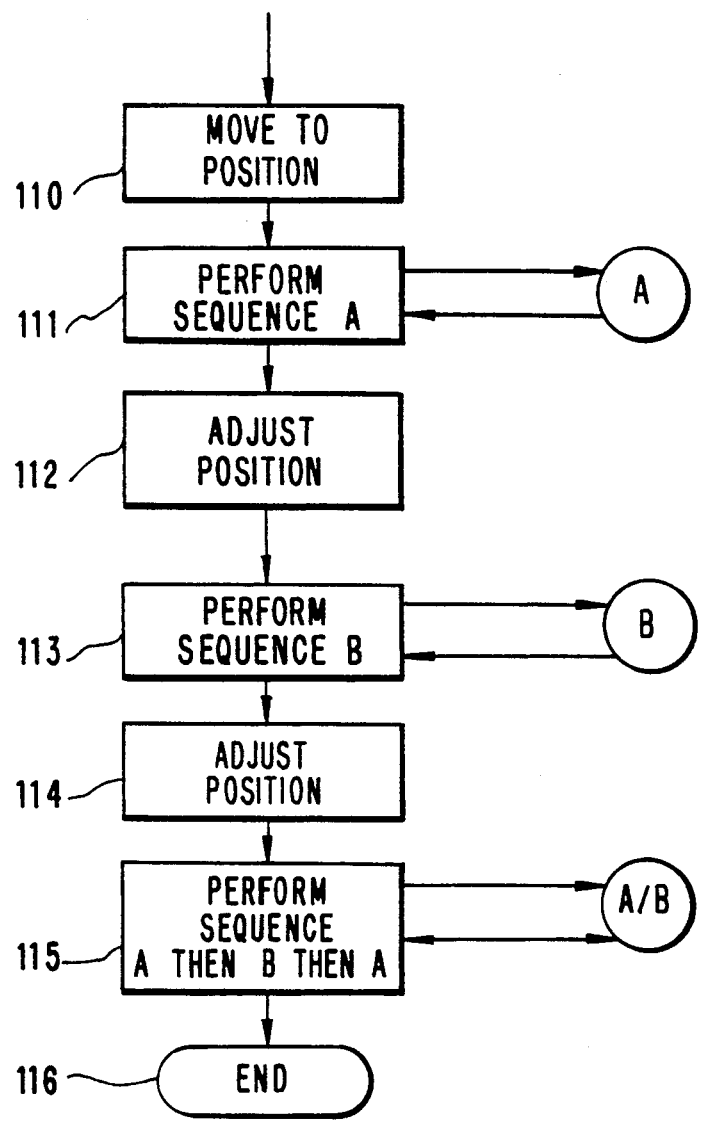
FIGS. 3A, 3B and 3C are illustrative flow diagrams of the program steps in building a coil winding in accordance with the teachings of this invention.
Figure 3B:
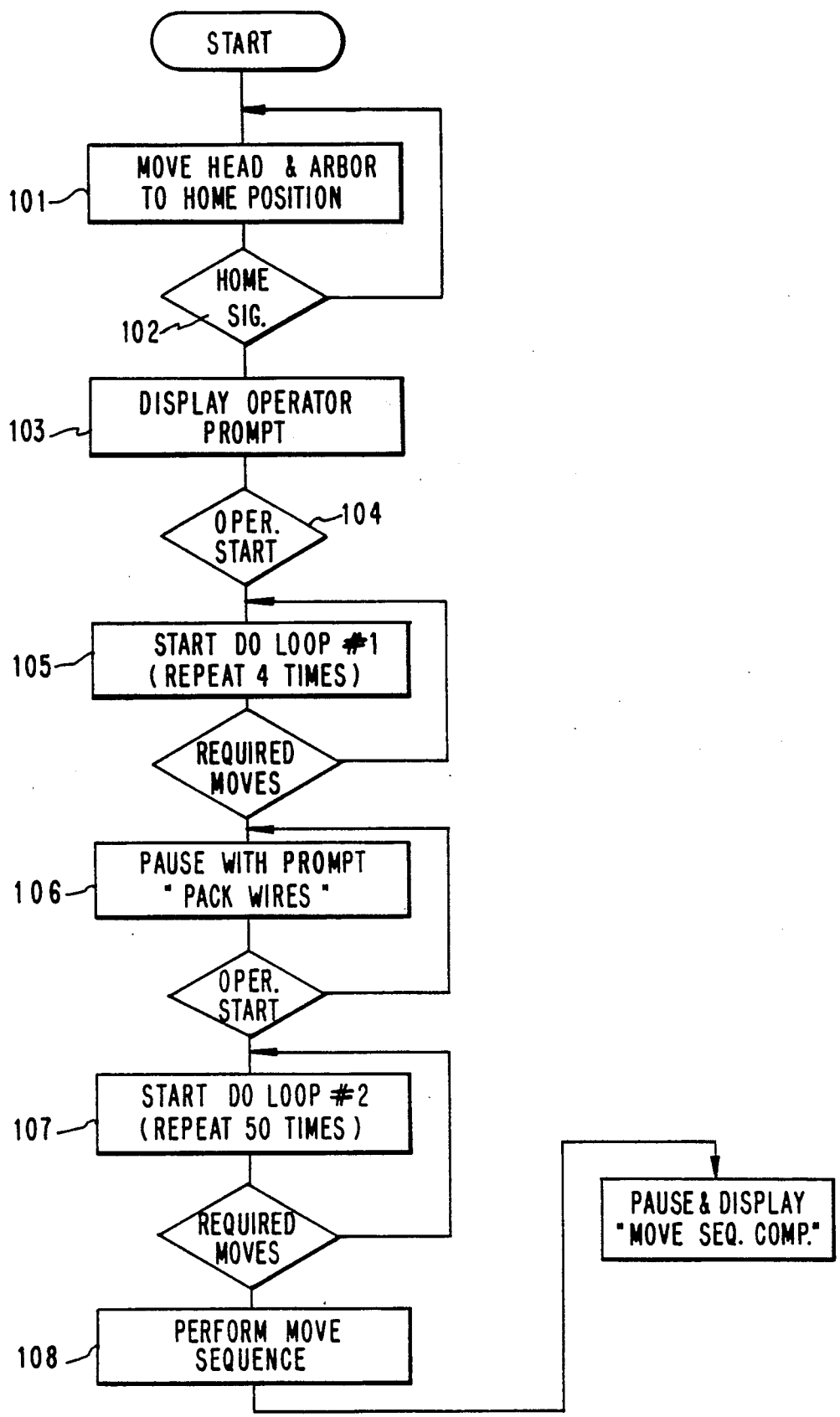
Figure 3C:
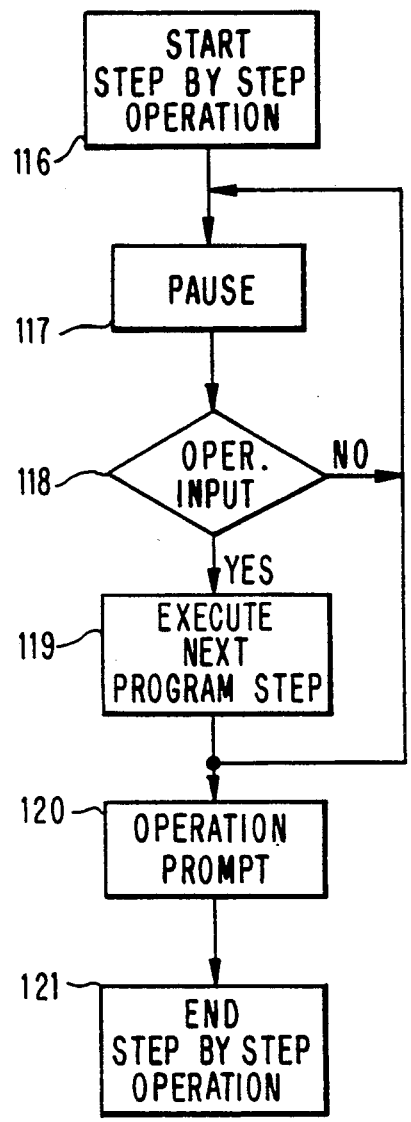

Referring now to FIGS. 3A, 3B and 3C, the program control and operator interface to the coil winding operation comprises a series of computer controlled positioning and sequencing subroutines illustrated in FIG. 3A. An example of a sequencing subroutine is illustrated in FIG. 3B, which will be described first.

Referring now to FIG. 3B, at the start of the program the computer issues a series of drive commands to the stepper motors to move the head and the arbor to their home position, block 101. When the Hall effect sensors signal arrival at the home position, block 102, the computer generates a operator prompt on the display screen, block 103, telling the operator the winding operation can commence. In response to an operator start command, block 104, the computer will send a sequence of subroutine commands to the stepper motors to move the head and arbor through a series of program moves called here DO LOOP #1. The DO LOOP commands, as graphically illustrated in FIG. 2, are a series of program steps which control the acceleration, extent of movement, and deceleration of the head and arbor in an alternating sequence of movement to lay down the winding filament in a desired pattern. As indicated in block 105, the DO LOOP may be repeated a number of times. When the required number of moves has been accomplished, block 106, the computer stops the motion of the head and the arbor and displays an operator prompt on the operator display screen prompting the operator to pack the filaments which have just been wound on the arbor. When the operator has completed his or her operation, he or she restarts the coil winding operation, box 106. The subroutine may include a second DO LOOP as indicated in box 107 and in some cases additional DO LOOPs, which are not indicated in this merely exemplary diagram. When the subroutine sequence is complete the program may advance the arbor to a new position prior to the start of the next subroutine sequence, block 108. The computer stops the operation and generates an suitable message on the display screen for the operator.

Referring now to FIG. 3A, a typical program comprises execution of a series of subroutine sequences, such as that described in connection with FIG. 3B, labeled as subroutines A and B. After completion of a subroutine and the movement of the arbor into position, block 110, sequence A is started and completed, block 111. At block 112 the arbor is again positioned and subroutine B is started and completed, block 113. Basically, this process of calling up subroutine sequences is repeated as many times as appropriate for the particular winding, as indicated by the blocks 114 and 115 until the winding is complete, block 116. It will be appreciated that more than two subroutines may be used, and that the number of times a subroutine is used is a function of the winding pattern.

FIG. 3C illustrates a subroutine in which the operator can cause the head and arbor motion to proceed one program step at a time. This subroutine sequence starts with an operator keyboard command, block 116. The computer subroutine running at the time stops in the program sequence in response to this input, block 117, and awaits an operator input, block 118. In response to an operator input the computer executes the next program step, block 119, which will produce an incremental movement of the head or the arbor. At the completion of the incremental move the operator will be prompted, block 120, and the process will repeat itself until terminated by the operator, block, 121. This procedure allows the operator to control the winding operation a critical times.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of computer control and operator interface for winding coils on a rotatable arbor with a translatable head, comprising the steps of:
   moving said arbor and said head alternatively in a series of discrete steps;
   controlling movement of said arbor and said head in each of said steps by commands from said computer, said commands specifying arbor and head acceleration and velocity; and
   interrupting said computer commands periodically and displaying a computer-generated message prompting operation action.

2. A computerized control and operator interface method as in claim 1 further including the step of generating individual move commands in response to an operator input.

3. A computer control and operator interface system for winding coils on a rotating arbor with a translatable head, comprising in combination:
   a first stepper motor coupled to said arbor to rotate said arbor in response to programmed computer commands;
   a second stepper motor coupled to said head to translate said head in response to programmed computer commands;
   an operator display;
   said computer generating commands alternately for said first and second stepper motors to cause said arbor and head to move in alternating discrete steps;
   said computer generating operating messages for said display;
   means for coupling said computer to said first and second stepper motors; and
   means for coupling said computer to said display.

* * * * *